(12) United States Patent  
Schwager et al.

(10) Patent No.: US 7,787,242 B2
(45) Date of Patent: Aug. 31, 2010

(54) METHOD AND APPARATUS FOR SUPPORTING A DISPLAY ON A CHASSIS

(75) Inventors: Mark A. Schwager, Austin, TX (US); Kevin L. Kamphuis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1385 days.

(21) Appl. No.: 11/227,351

(22) Filed: Sep. 15, 2005

(65) Prior Publication Data

US 2007/0058331 A1    Mar. 15, 2007

(51) Int. Cl.
    *H05K 5/00* (2006.01)
    *H05K 7/00* (2006.01)
(52) U.S. Cl. ............................ 361/679.28; 361/679.27; 361/679.29; 361/679.06; 361/679.07
(58) Field of Classification Search ............ 361/679.27, 361/679.28, 679.29, 679.06, 679.07
    See application file for complete search history.

(56) References Cited

U.S. PATENT DOCUMENTS

| | | | |
|---|---|---|---|
| 6,266,236 B1 * | 7/2001 | Ku et al. ................. | 361/679.27 |
| 6,392,877 B1 | 5/2002 | Iredale | |
| 6,430,038 B1 * | 8/2002 | Helot et al. ............. | 361/679.05 |
| 6,665,175 B1 * | 12/2003 | deBoer et al. .......... | 361/679.06 |
| 6,771,494 B2 | 8/2004 | Shimano | |
| 6,829,140 B2 | 12/2004 | Shimano et al. | |
| 7,277,275 B2 * | 10/2007 | Won et al. ............... | 361/679.27 |
| 7,283,355 B2 * | 10/2007 | Han ........................ | 361/679.55 |
| 2006/0152893 A1 * | 7/2006 | Chen ......................... | 361/681 |

* cited by examiner

*Primary Examiner*—Jayprakash N Gandhi
*Assistant Examiner*—Anthony M Haughton
(74) *Attorney, Agent, or Firm*—Haynes and Boone, LLP (57) ABSTRACT

A display support apparatus includes a stabilizing member defining a cable passageway, a rotational coupling member coupled to the stabilizing member, and a plurality of supporting arms coupled to the stabilizing member, at least one supporting arm defining a cable-routing channel, whereby the stabilizing member rigidly maintains the plurality of supporting arms in a substantially parallel orientation relative to each other. The display support apparatus may be rotatably coupled to a chassis base and a display may be rotatably coupled to the support arms to provide rigid support for the display on the chassis.

20 Claims, 12 Drawing Sheets

METHOD AND APPARATUS FOR SUPPORTING A DISPLAY ON A CHASSIS

BACKGROUND

The present disclosure relates generally to information handling systems, and more particularly to supporting a display on an information handling system chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Display rigidity is an important factor in users deciding whether to purchase an information handling system such as, for example, a portable or notebook information handling system. The display on such information handling systems is typically directly coupled to the information handling system chassis base and operable to move between a closed position, for storage of the information handling system, to an open position, for use of the information handling system. If the display bends or twists upon moving the display between the open and closed position, users may consider it not durable. Typically, display rigidity is increased by increasing the stiffness of the back cover of the display.

However, some information handling systems such as, for example, tablet information handling systems, include a display which is coupled to a chassis such that the display is allowed to rotate 180 degrees relative to its supports. For example, the display may be rotatably coupled to a plurality of support arms which are rotatably coupled to the chassis. The support arms may then be rotated from a closed position where the display is parallel to and engaged with the chassis with the monitor on the display facing the chassis, to an open position where the display is perpendicular to the chassis, allowing the tablet information handling system to be used in a notebook mode. Furthermore, with the support arms in the open position, the display may be rotated 180 degrees relative to the support arms. The support arms may then be moved to the closed position such that the display is parallel to and engage with the chassis and the monitor is facing away from the chassis, allowing the tablet information handling system to be used in a tablet mode. Manufacturing a rigid display presents challenges with regards to tablet information handling systems as increasing the stiffness of the back cover of the display will not make the display more rigid because the display is not directly coupled to the base. Such information handling system displays tend to bend and twist relative to the information handling system chassis base.

Accordingly, it would be desirable to provide for supporting a display on a chassis absent the disadvantages found in the prior methods discussed above.

SUMMARY

According to one embodiment, a display support apparatus is provided which includes a stabilizing member defining a cable passageway, a rotational coupling member coupled to the stabilizing member, and a plurality of supporting arms coupled to the stabilizing member, at least one supporting arm defining a cable-routing channel, whereby the stabilizing member rigidly maintains the plurality of supporting arms in a substantially parallel orientation relative to each other.

BRIEF DESCRIPTION OF THE DRAWINGS

FIG. 2a is a perspective view illustrating an embodiment of a support arm.

FIG. 2b is a perspective view illustrating an embodiment of the support arm of FIG. 2a.

FIG. 7b is a perspective view illustrating an embodiment of the display of FIG. 7a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
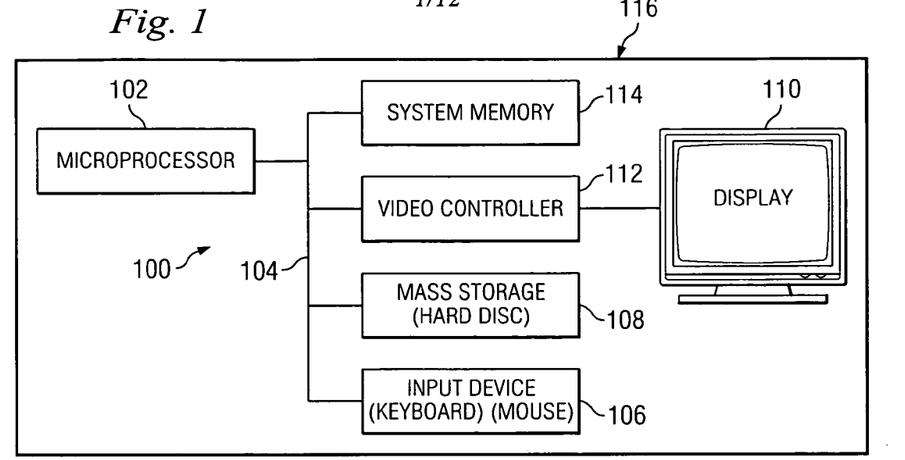
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of the information handling system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to the microprocessor 102. Mass storage devices include such devices as hard disks, optical disks, magneto-optical drives, floppy drives and the like. Information handling system 100 further includes a display 110, which is coupled to the microprocessor 102 by a video controller 112. In an embodiment, the display 110 may also be utilized as the input device 106 such as, for example, by means of a pressure-sensitive display. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other buses and intermediate circuits can be deployed between the components described above and microprocessor 102 to facilitate interconnection between the components and the microprocessor.

Figures 2A, 2B:
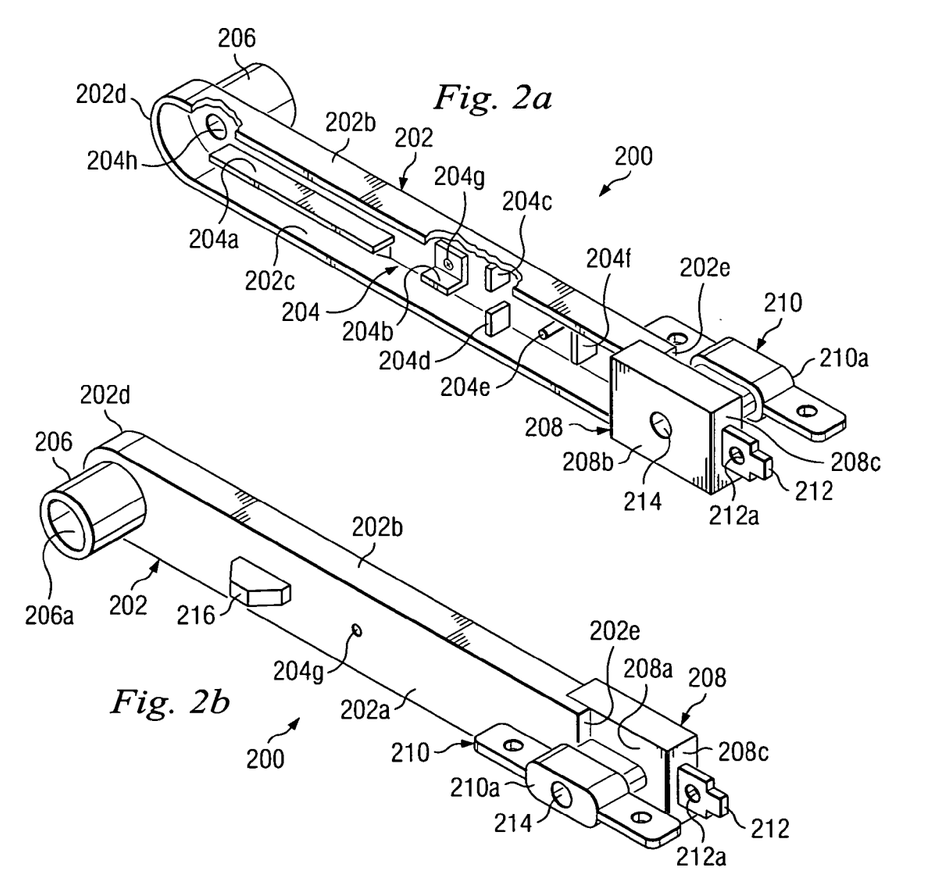

Referring now to FIGS. 2*a* and 2*b*, a support arm 200 is illustrated. The support arm 200 includes an elongated base member 202 having a front surface 202*a*, a plurality of side walls 202*b* and 202*c* extending from opposite sides of the front surface 202*a* and along the length of the base member 202, and a plurality of opposing distal ends 202*d* and 202*e*. A cable-routing channel 204 is defined by the base member 202 and located between the side walls 202*b* and 202*c* and along the length of the base member 202. A plurality of routing members 204*a*, 204*b*, 204*c*, 204*d*, 204*e*, and 204*f* extend from the base member 202 and into the cable-routing channel 204 and are located at various points along the length of the cable-routing channel 204. A cover-coupling aperture 204*g* is defined by the base 202 and located in the cable-routing channel 204 and adjacent the routing member 204*b*. A cable routing aperture 204*h* is defined by the base 202 and located in the cable routing channel 204 and adjacent the distal end 202*d* of the base member 202. A stabilizing-member coupler 206 extends from the front surface 202*a* of the base member 202 and is located adjacent the distal end 202*e* of the base member 202. The stabilizing-member coupler 206 defines a stabilizing member passageway 206*a* which extend along the length of the stabilizing-member coupler 206 to the cable routing aperture 204*h*, providing a cable passageway through the stabilizing-member coupler 206 to the cable routing channel 204. A display coupling member 208 including a front surface 208*a*, a rear surface 208*b* located opposite the front surface 208*a*, and a side surface 208*c* extending between the front surface 208*a* and the rear surface 208*b*, extends from the distal end 202*e* of the base member 202. A rotational coupling 210 extends from the front surface 208*a* of the display coupling member 208 and includes a display coupler 210*a* rotatably coupled to it. A cover coupling member 212 extends from the side surface 208*c* of the display coupling member 208 and defines a cover coupling aperture 212*a*. A cable routing passageway 214 is defined by the display coupling member 208, the rotational coupling 210, and the display coupler 210*a*. A display securing member 216 extends from the front surface 208*a* and is located adjacent the distal end 202*e* and the stabilizing-member coupler 206. In an embodiment, the support arm 200 is fabricated from a light-weight metal such as, for example, aluminum or an aluminum alloy, which allows size, weight, and cost to be minimized.

Figures 2C, 3, 4, 5:
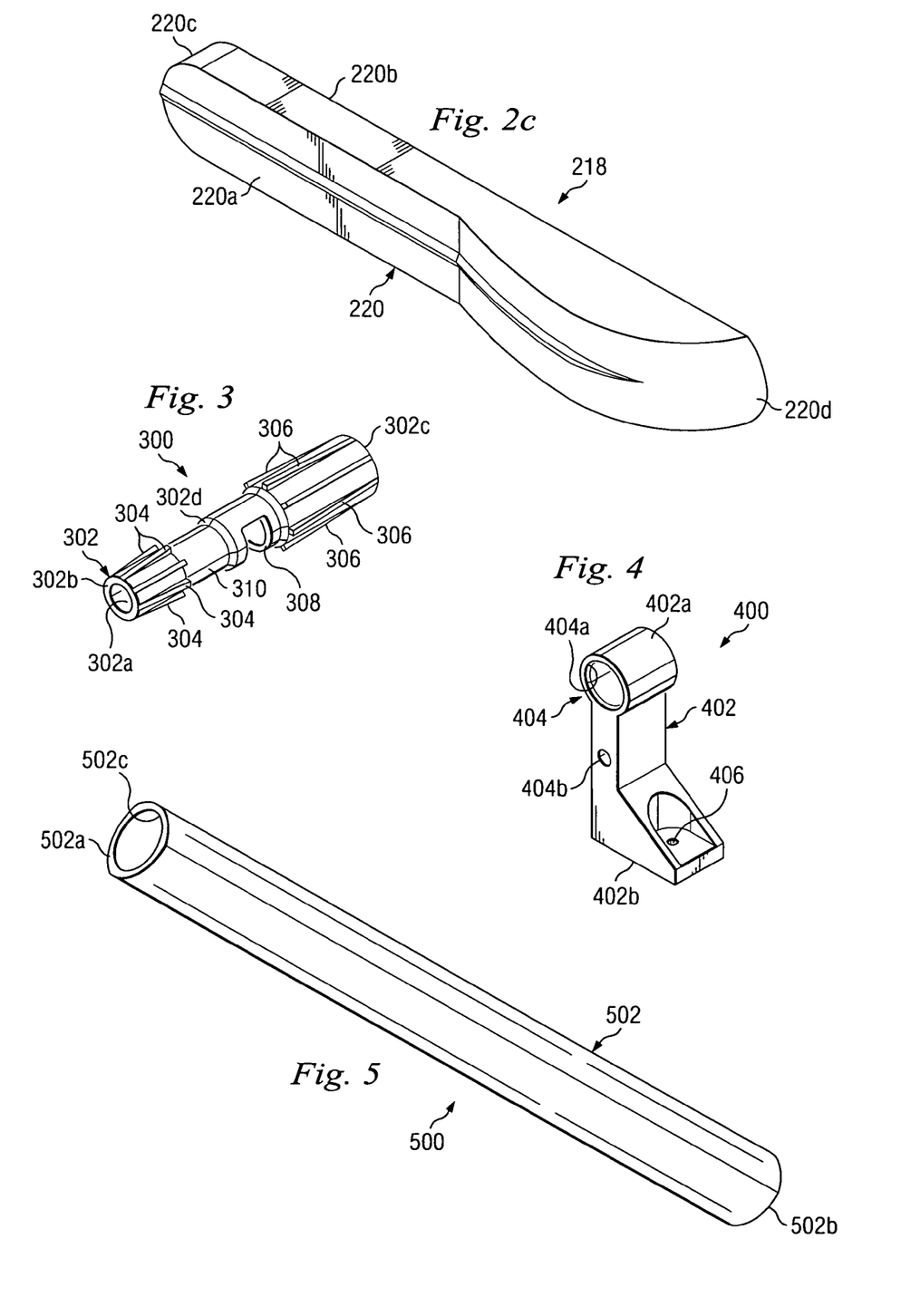
FIG. 2c is a perspective view illustrating an embodiment of a support arm cover used with the support arm of FIGS. 2a and 2b.
FIG. 3 is a perspective view illustrating an embodiment of an interference coupler used with the support arm of FIGS. 2a and 2b.
FIG. 4 is a perspective view illustrating an embodiment of a base mount used with the interference coupler of FIG. 3.
FIG. 5 is a perspective view illustrating an embodiment of a torsion bar used with the interference coupler of FIG. 3 and the support arm of FIGS. 2a and 2b.

Referring now to FIG. 2*c*, a support arm cover 218 is illustrated. Support arm cover 218 includes an elongated base 220 having a front surface 220*a*, a support arm coupling edge 220*b* located opposite the front surface 220*a*, and a pair of opposing distal ends 220*c* and 220*d* located on either end of the elongated base 220. In an embodiment, the support arm 200 is fabricated from a light-weight material such as, for example, aluminum or an aluminum alloy, which allow size, weight, and cost to be minimized.

Referring now to FIG. 3, an interference coupler 300 is illustrated. Interference coupler 300 includes a tubular base member 302 which defines a cable passageway 302*a* along its length and includes a pair of opposing distal ends 302*b* and 302*c* and an outer surface 302*d*. In an embodiment, the cable passageway 302*a* is designed to allow for cable routing which prevents cable damage while allowing the interference coupler 300 to remain very stiff torsionally. A plurality of interference-fit members 304 extend from the outer surface 302*d* of the of the base member 302, are located adjacent the distal end 302*b*, and increase in thickness along the length of the base member 302 starting from the distal end 302*b*. A plurality of interference-fit members 306 extend from the outer surface 302*d* of the of the base member 302, are located adjacent the distal end 302*c*, and increase in thickness along the length of the base member 302 starting from the distal end 302*c*. A cable entrance 308 is defined by the base member 302, substantially centrally located on the base member 302 adjacent the plurality of interference-fit members 306, and provides access to the cable passageway 302a. In an embodiment, the cable entrance 308 is defined on over 180 degrees of the outer surface 302d. A base mount surface 310 is located on the base member 302 between the plurality of interference-fit members 304 and the cable entrance 308. In an embodiment, the interference coupler 300 is fabricated from a high-strength metal such as, for example, heat-treated steel, and may include section of increased diameter in order to meet strength requirements for a particular application.

Referring now to FIG. 4, a base mount 400 is illustrated. The base mount 400 includes a base member 402 having a top end 402a and a bottom end 402b located opposite the top end 402a. A interference coupler passageway 404 is defined by the base member 402, located adjacent the top end 402a of the base member 402, and includes an adjustable member 404a which may be adjusted using an adjuster 404b in order to change the diameter of the interference coupler passageway 404. A base mount aperture 406 is defined by the base member 402 and located adjacent the bottom end 402b of the base member 402.

Referring now to FIG. 5, a torsion bar 500 is illustrated. The torsion bar 500 includes an elongated tubular member 502 having a pair of opposing distal ends 502a and 502b and defining a passageway 502c along its length from the distal end 502a to the distal end 502b. In an embodiment, the torsion bar 500 is fabricated from a light-weight metal such as, for example, aluminum or an aluminum alloy.

Figure 6:
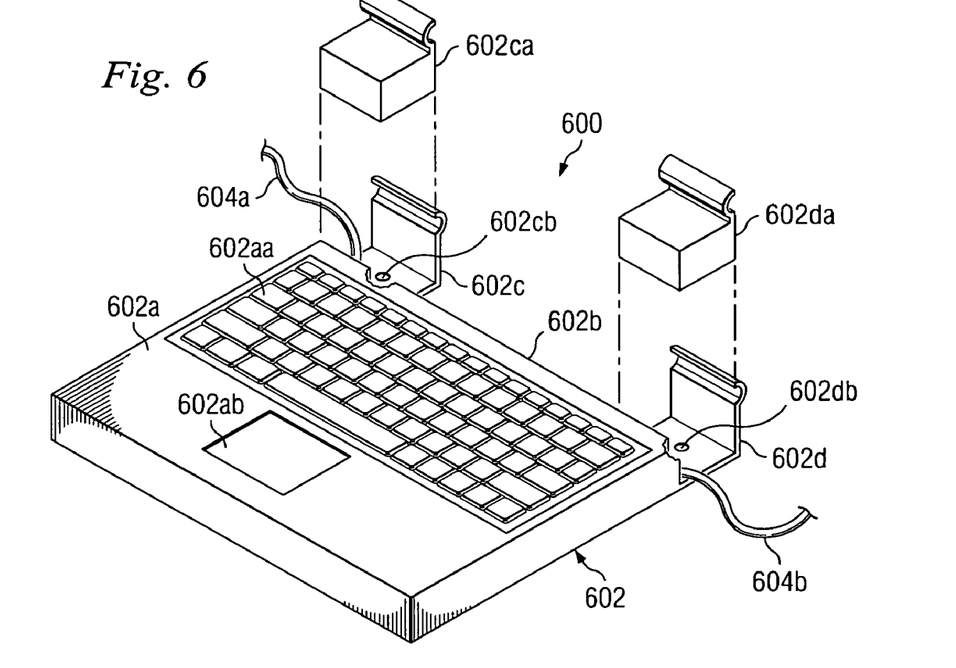
FIG. 6 is a perspective view illustrating an embodiment of a chassis used with the support arm of FIGS. 2a and 2b, the interference coupler of FIG. 3, and the torsion bar of FIG. 5.

Referring now to FIG. 6, a chassis 600 is illustrated. The chassis 600 includes a chassis base 602 having an input device surface 602a, a plurality of input devices 602aa and 602ab located on the input device surface 602a, a rear surface 602b, and a plurality of base beams 602c and 602d extending from opposite ends of the rear surface 602b of the chassis base 602 in a spaced apart relationship. Each of the base beams 602c and 602d include a stabilizing-member coupler 602ca and 602da, respectively, and defines a mounting aperture 602cb and 602db, respectively. In an embodiment, the chassis base 202 may be, for example, the chassis 116 described above with reference to FIG. 1, and houses some of the components of the information handling system 100 described above with reference to FIG. 1. A plurality of display cables 604a and 604b extend from the chassis base 602 adjacent the base beams 602c and 602d, respectively.

Figure 7A:
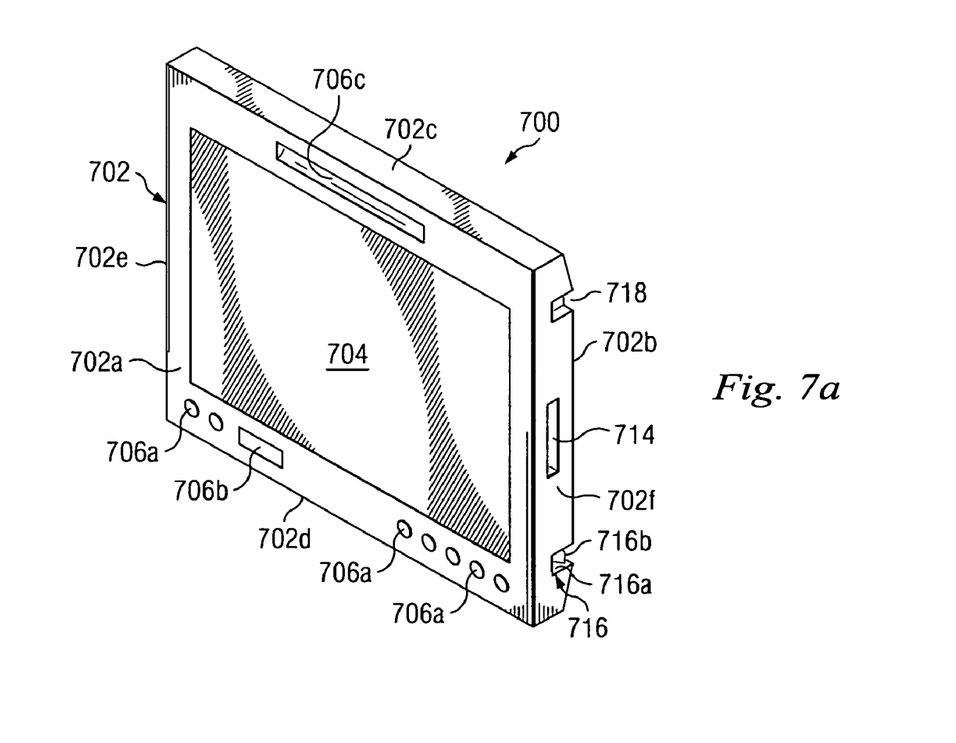
FIG. 7a is a perspective view illustrating an embodiment of a display used with the support arm of FIGS. 2a and 2b, the interference coupler of FIG. 3, the torsion bar of FIG. 5, and the chassis of FIG. 6.
Figure 7B:
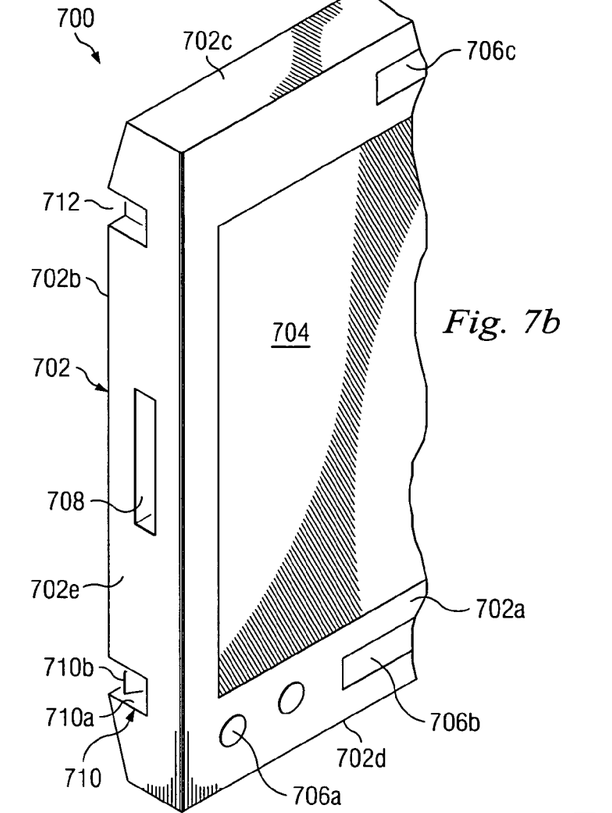

Referring now to FIGS. 7a and 7b, a display 700 is illustrated. The display 700 includes a base 702 having a front surface 702a, a rear surface 702b located opposite the front surface 702a, a top surface 702c extending between the front surface 702a and the rear surface 702b, a bottom surface 702d located opposite the top surface 702c and extending between the front surface 702a and the rear surface 702b, and a pair of opposing side surfaces 702e and 702f extending between the front surface 702a, the rear surface 702b, the top surface 702c and the bottom surface 702d. In an embodiment, the display 700 may be the display 110 described above with reference to FIG. 1. A monitor 704 is located on the front surface 702a of the base 702 and, in an embodiment, the monitor 704 may be an input device such as, for example, a touch screen. A plurality of control devices 706a are located on the front surface 702a of the base 702 between the monitor 704 and the bottom surface 702d. A plurality of indicator devices 706b are located on the front surface 702a of the base 702 between the monitor 704 and the bottom surface 702d. A pen channel 706c is defined by the base 702 and located on the front surface 702a of the base 702 between the monitor 704 and the top surface 702c of the base 702.

A support arm coupling channel 708 is defined by the base 702 and is substantially centrally located on the side surface 702e of the base 702. A support arm coupling member 710 is located on the side surface 702e adjacent the bottom surface 702d of the base 702 and includes a detent channel 710a and a detent 710b which is located in the detent channel 710a and resiliently biased into the detent channel 710a. A display coupling member channel 712 is defined by the base 702 and located on the side surface 702e of the base 702 adjacent the top surface 702c of the base 702 and opposite the detent channel 710a such that the support arm coupling channel 708 is located between the detent channel 710a and the display coupling member channel 712.

A support arm coupling channel 714 is defined by the base 702 and is substantially centrally located on the side surface 702f of the base 702. A support arm coupling member 716 is located on the side surface 702f adjacent the bottom surface 702d of the base 702 and includes a detent channel 716a and a detent 716b which is substantially similar in design and operation to the detent 710b described above. A display coupling member channel 718 is defined by the base 702 and located on the side surface 702f of the base 702 adjacent the top surface 702c of the base 702 and opposite the detent channel 716a such that the support arm coupling channel 714 is located between the detent channel 716a and the display coupling member channel 718.

Figure 8:
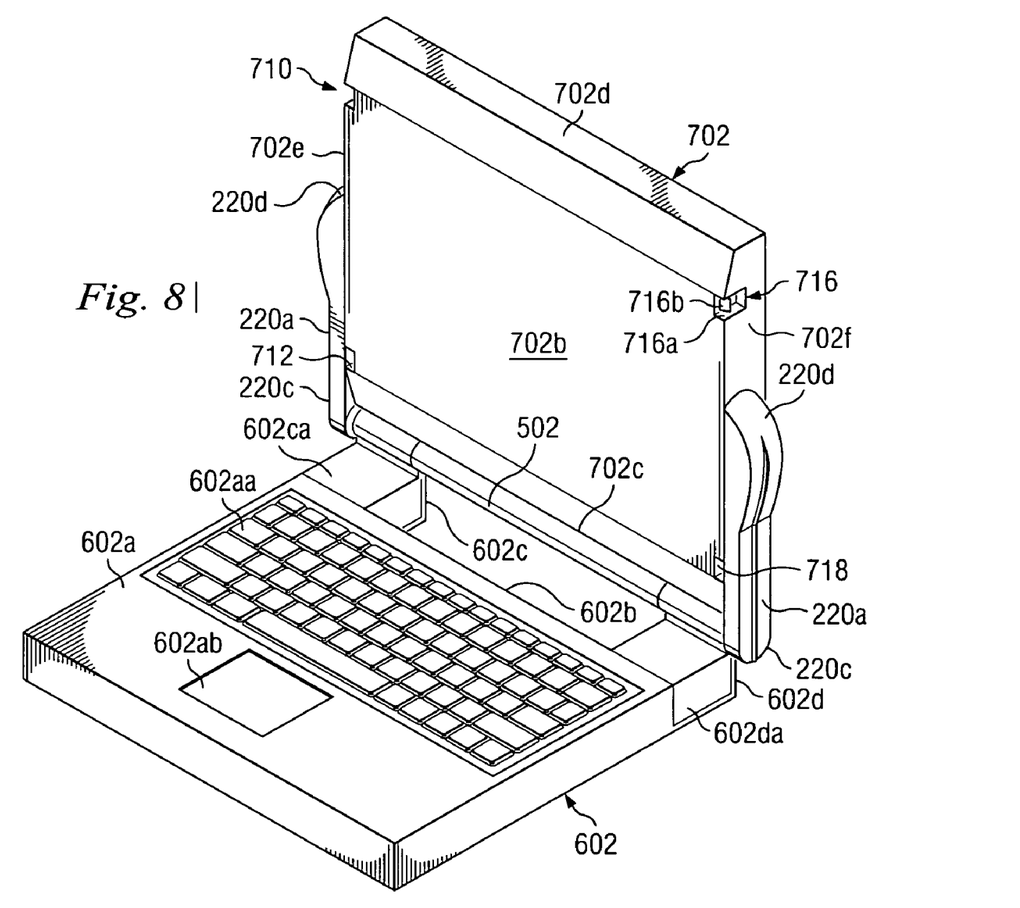
FIG. 8a is a flowchart illustrating an embodiment of a method for supporting a display on a chassis.
FIG. 8b is a perspective view illustrating an embodiment of the interference coupler of FIG. 3 coupled to the base mount of FIG. 4.
FIG. 8c is a perspective view illustrating an embodiment of the interference coupler of FIG. 3 being coupled to the support arm of FIGS. 2a and 2b and the torsion bar of FIG. 5.
FIG. 8d is a perspective view illustrating an embodiment of the interference coupler of FIG. 3 coupled to the support arm of FIGS. 2a and 2b and the torsion bar of FIG. 5.
FIG. 8e is a perspective view illustrating an embodiment of a display cable routed through the interference coupler of FIG. 3 and the support arm of FIGS. 2a and 2b.
FIG. 8f is a perspective view illustrating an embodiment of the support arm cover of FIG. 2c coupled to the support arm of FIG. 8e.
FIG. 8g is a perspective view illustrating an embodiment of the torsion bar, interference couplers, support arms, and support arm covers of FIG. 8f being coupled to the chassis of FIG. 6.
FIG. 8h is a perspective view illustrating an embodiment of the torsion bar, interference couplers, support arms, and support arm covers of FIG. 8f coupled to the chassis of FIG. 6.
FIG. 8*i* is a perspective view illustrating an embodiment of the display of FIG. 7 coupled to the supporting arms of FIG. 8*h* in a notebook mode and in an open position.
FIG. 8*j* is a perspective view illustrating an embodiment of the display and chassis of FIG. 8*i* in a closed position.
FIG. 8*k* is a perspective view illustrating an embodiment of the display and chassis of FIG. 8*i* with the display being rotated relative to the support arms.
FIG. 8*l* is a perspective view illustrating an embodiment of the display and chassis of FIG. 8*i* with the display rotated approximately 180 degrees relative to the support arms in FIG. 8*j*.
FIG. 8*m* is a perspective view illustrating an embodiment of the display and chassis of FIG. 8*i* in a tablet mode.
Figure 8A:
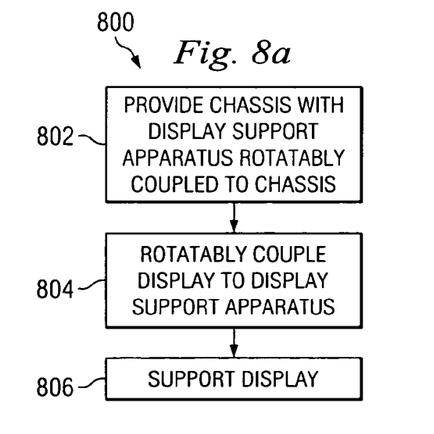
Figure 8B:
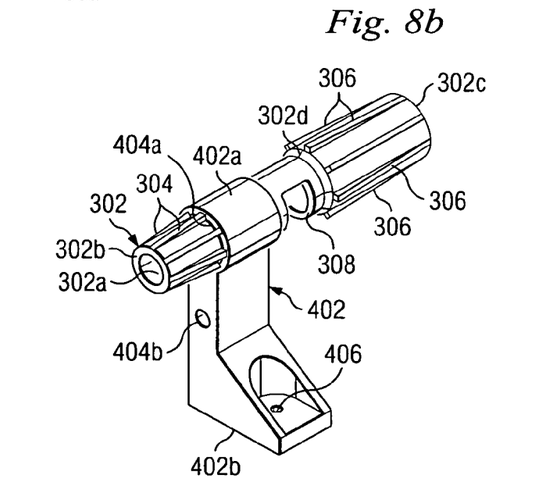
Figure 8C:
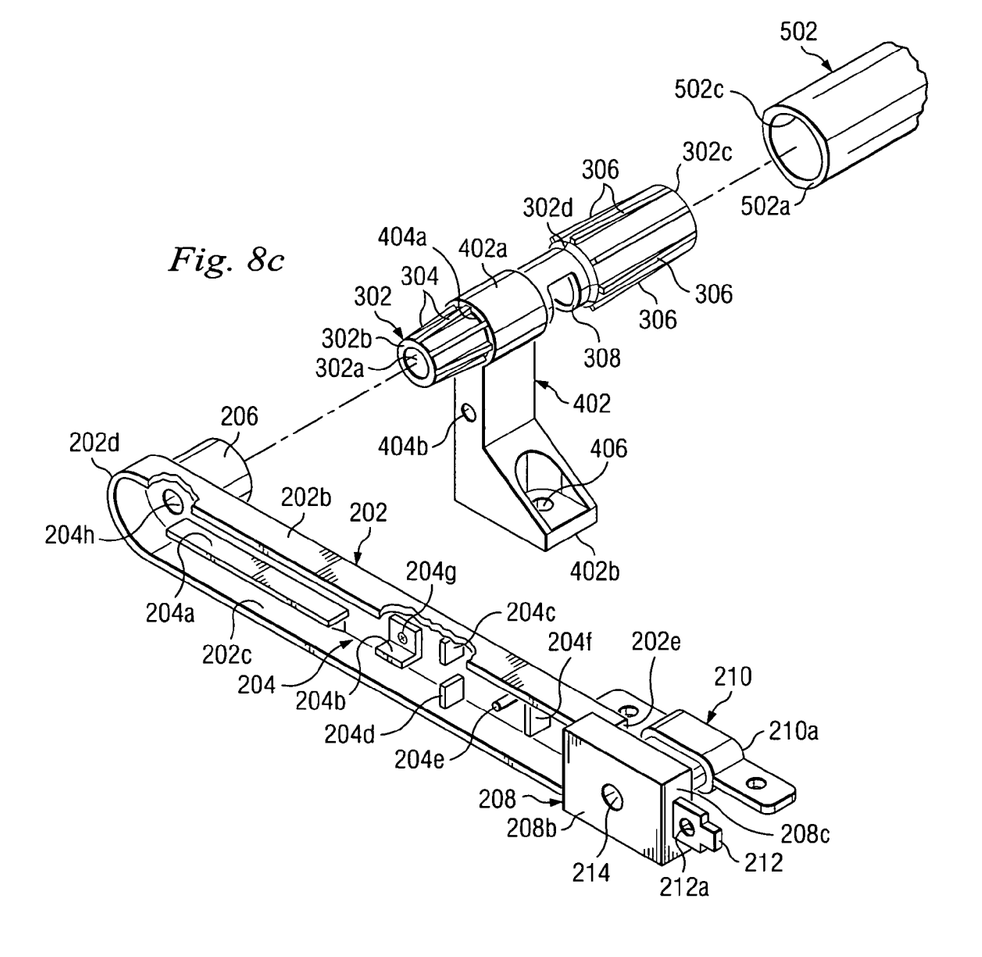
Figure 8D:
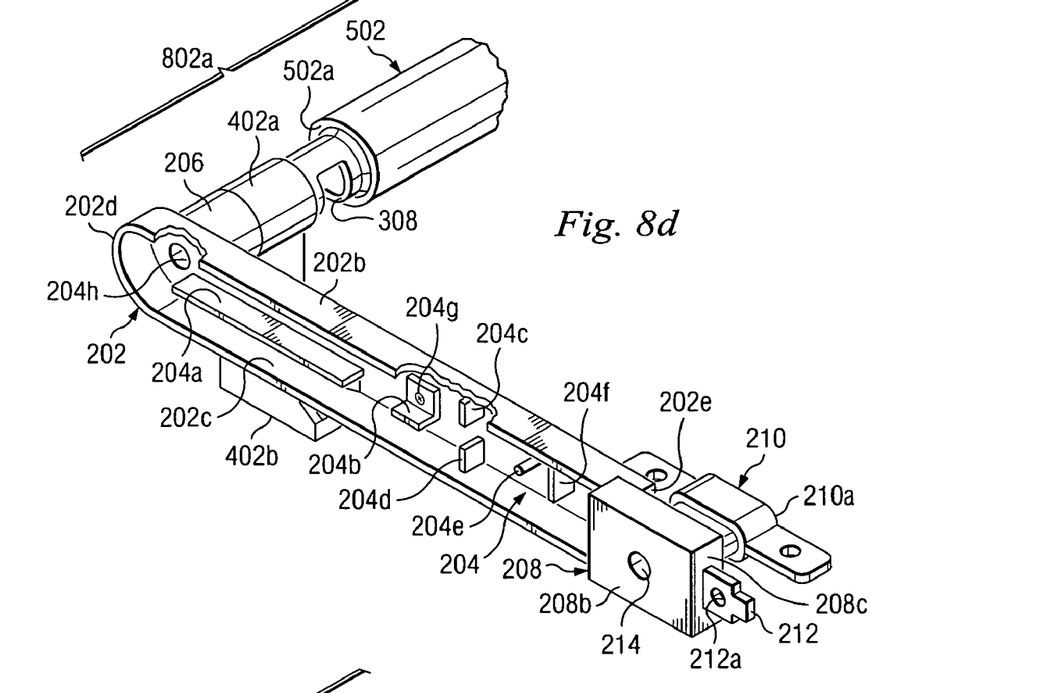

Referring now to FIGS. 3, 4, 8a, and 8b, a method 800 for supporting a display on a chassis is illustrated. The method 800 begins at step 802 where the chassis 600 is provided with a display support apparatus rotatably coupled to the chassis 600. The interference coupler 300 is rotatably coupled to the base mount 400 by first increasing the diameter of the interference coupler passageway 404 by using the adjuster 404b to adjust the adjustable member 404a. The distal end 302b of the interference coupler 300 may then be moved through the interference coupler passageway 404 such that the base mount surface 310 is positioned in the interference coupler passageway 404, as illustrated in FIG. 8b. The adjuster 404b may then be used to adjust the adjustable member 404a to engage the base mount surface 310 in order to adjust the force necessary to rotate the interference coupler 300 relative to the base mount 400. In an embodiment, a variety of different methods known in the art may be used to adjust the force necessary to rotate the interference coupler 300 relative to the base mount 400 in place of the adjuster 404b.

Referring now to FIGS. 2a, 2b, 5, 8b, 8c, and 8d, the interference coupler 300 rotatably coupled to the base mount 400 is then coupled to the torsion bar 500. The interference coupler 300 is positioned such that the distal end 302c of the interference coupler 300 is adjacent the distal end 502a of the torsion bar 500, illustrated in FIG. 8c. The distal end 302c of the interference coupler 300 is then moved into the passageway 502c of the torsion bar 500 such that the interference-fit members 306 engage the torsion bar 500, illustrated in FIG. 8d. The interference-fit members 306 are designed such that, upon engaging the torsion bar 500, they will not allow the interference coupler 300 to rotate relative to the torsion bar 500. For example, when the interference coupler 300 is fabricated from a high strength metal and the torsion bar 500 is fabricated from a light weight metal, the engagement of the interference-fit members 306 and the torsion bar 500 deforms the torsion bar 500 and secures the interference fit coupler 300 in the torsion bar 500. An interference coupler 300 rotatably coupled to a base mount 400 may then also be coupled to the distal end 502b of the torsion bar 500 in substantially the same manner as described above for coupling to the distal end 502a of the torsion bar 500, providing a stabilizing member 802a, illustrated in FIG. 8*d*, including the torsion bar 500 with an interference coupler 300 coupled to each distal end 502*a* and 502*b* of the torsion bar, and a base mount rotatably coupled to each interference coupler 300.

The support arm 200 is then coupled to the stabilizing member 802*a*. The distal end 302*b* on the interference coupler 300 is positioned adjacent the stabilizing-member coupler 206, illustrated in FIG. 8*c*. The distal end 302*b* of the interference coupler 300 is then moved into the stabilizing-member passageway 206*a* of the support arm 200 such that the interference-fit members 304 engage the stabilizing-member coupler 206, illustrated in FIG. 8*d*. The interference-fit members 304 are designed such that, upon engaging the stabilizing-member coupler 206, they will not allow the interference coupler 300 to rotate relative to the stabilizing-member coupler 206. For example, when the interference coupler 300 is fabricated from a high strength metal and the support arm 200 is fabricated from a light weight metal, the engagement of the interference-fit members 304 deform the stabilizing-member coupler 206 and secure the interference fit coupler 300 in the stabilizing-member coupler 206. A support arm 200 may then also be coupled to the interference coupler 300 on the distal end 502*b* of the torsion bar 500 in substantially the same manner as described above for coupling to the interference coupler 300 on distal end 502*a* of the torsion bar 500. The interference fit between the support arms 200, the interference couplers 300, and the torsion bar 500 results in a stabilizing member 802*a* which acts as one piece, with the torsion bar 500 structurally joining the support arms 200 and providing torsional and bending stiffness for the stabilizing member 802*a* while the interference couplers 300 create a very strong joint in torsion and bending also.

Figure 8E:
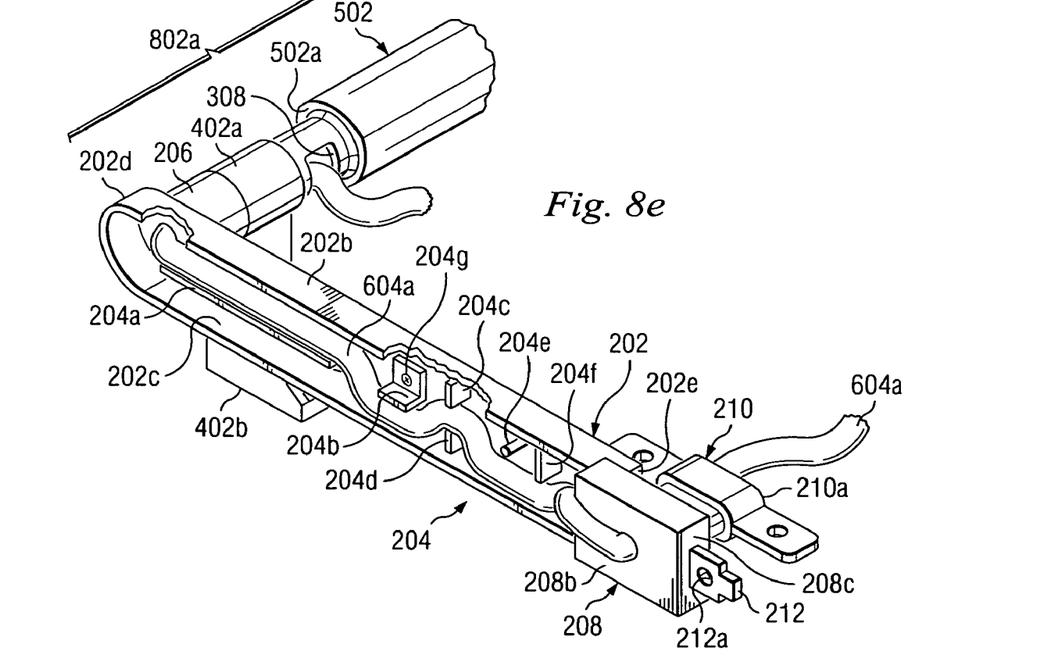
Figure 8F:
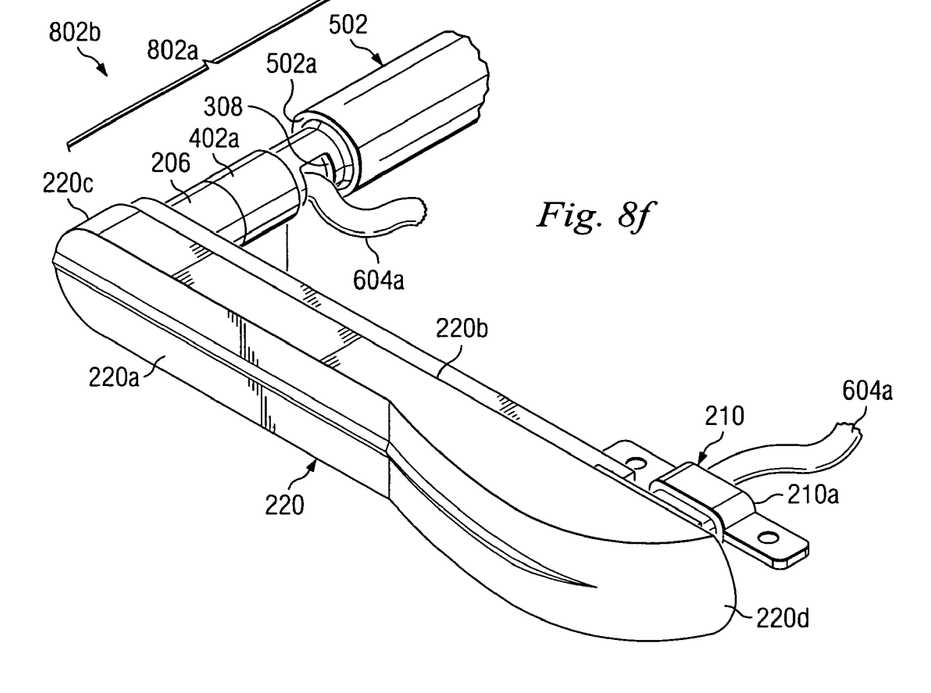
Figure 8G:
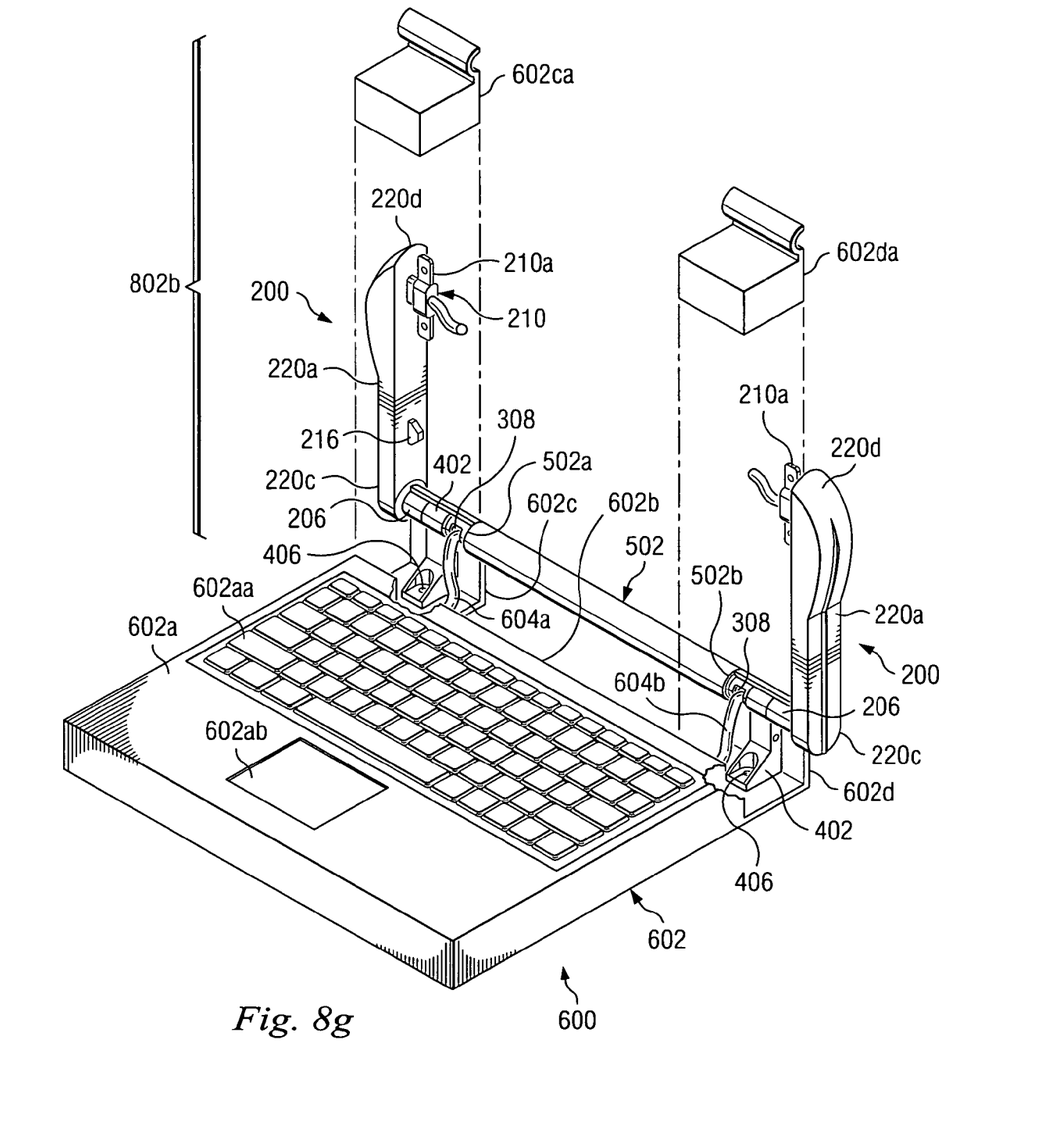
Figure 8H:
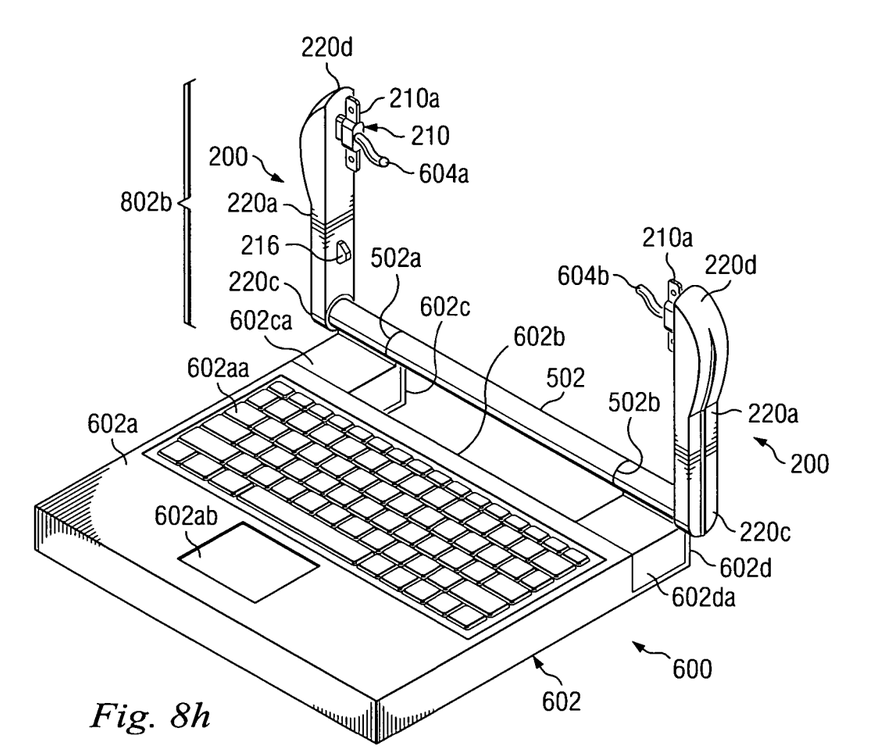

Referring now to FIGS. 2*a*, 2*b*, 6, 8*b*, 8*d*, and 8*e*, the display cable 604*a* from chassis 600 is routed through the interference coupler 300 on stabilizing member 802*a* and the support arm 200. The display cable 604*a* is routed through the cable entrance 308 on the interference coupler 300 and into the cable passageway 302*a* on interference coupler 300. The display cable 604*a* continues through the stabilizing-member passageway 206*a* and into the cable routing channel 204 on the support arm 200 by way of the cable routing aperture 204*h*. The display cable 604*a* is then routed through the cable routing channel 204 by engagement with the routing members 204*a*, 204*b*, 204*c*, 204*d*, 204*e*, and 204*f*. The display cable 604*a* is then routed through the cable routing passageway 214 and out past the display coupling 210*a* on rotational coupler 210, as illustrated in FIG. 8*e*. The display cable 604*b* from chassis 600 may then be routed through the interference coupler 300 coupled to the distal end 502*b* of torsion bar 500 on stabilizing member 802*a* and through the support arm 200 in substantially the same manner as described above for the interference coupler 300 coupled to the distal end 502*a* of torsion bar 500 on stabilizing member 802*a*.

Referring now to FIGS. 2*c*, 8*a*, 8*e*, and 8*f*, the support arm cover 218 is then coupled to the support arm 200. The support arm cover 218 is positioned adjacent the support arm 200 such that the distal end 220*c* on support arm cover 218 is adjacent the distal end 202*d* on support arm 200, and the distal end 220*d* on support arm cover 218 is adjacent the distal end 202*e* on support arm 200. The support arm cover 218 may then be coupled to the support arm 200, illustrated in FIG. 8*f*, using conventional methods known in the art such as, for example, a threaded fastener through the cover coupling aperture 204*g* and 212*a* which engage the support arm cover 218. A support arm cover 218 may also be coupled the support arm 200 coupled to the interference coupler 300 which is coupled to the distal end 502*b* of torsion bar 500 on stabilizing member 802*a* in substantially the same manner as described above for the support arm cover 218 and the support arm 200 coupled to the interference coupler 300 which is coupled to the distal end 502*a* of torsion bar 500 on stabilizing member 802*a*. In an embodiment, the support arm covers 218 couple to the support arms 200 in a synergistic fashion which results in an arm that is much stronger than either of its parts and provides an arm that is strong in torsion and bending in all directions. With the plurality of support arms 200 coupled to opposite ends of the stabilizing member 802*a*, a display support apparatus 802*b* is provided.

Referring now to FIGS. 6, 8*a*, 8*f*, 8*g*, and 8*h*, the display support apparatus 802*b* is coupled to the chassis 600. The base mount 400 on the interference coupler 400 which is coupled to the distal end 502*a* of the torsion bar 500 is engaged with the base beam 602*c*, and the base mount 400 on the interference coupler 400 which is coupled to the distal end 502*b* of the torsion bar 500 is engaged with the base beam 602*d*, illustrated in FIG. 8*g*. The base mounts 400 may be mounted to the base beams 602*c* and 602*d* using conventional method known in the art such as, for example, a threaded fastener through the base mount apertures 406 and the mounting apertures 602*cb* and 602 *db*, respectively, on the base beams 602*c* and 602*d*, respectively. With the base mounts 400 mounted to the base beams 602*c* and 602*d*, the display support apparatus 802*b* is operable to rotate about the base mounts 400, and the cable entrances 308 on the interference couplers 300 are located between the two base mounts 400. In an embodiment, the cable entrances 308 are defined on over 180 degrees of the outer surface 302*d* of the interference couplers 300 in order to allow 180 degrees of rotation by the display support apparatus 802*b* relative to the chassis base 602 while not risking damage to the display cables 604*a* and 604*b* during rotation. In an embodiment, locating the cable entrances 308 between the two base mounts 400 ensures that the bend strength of the support arms 200 will not be compromised by the interference couplers 300 due to the need to remove material to provide the cable entrances 308. The stabilizing member couplers 602*ca* and 602*da* are then coupled to the base beams 602*c* and 602*d*, respectively, illustrated in FIG. 8*h*, using conventional methods known in the art.

Referring now to FIGS. 7*a*, 7*b*, 8*a*, 8*h*, and 8*i*, the method 800 proceeds to step 804 where the display 700 is rotatably coupled to the support arms 200. The display cables 604*a* and 604*b* are coupled to the display 700 and the display couplers 210*a* on the support arms 200 are positioned in the support arm coupling channels 708 and 714 on each side surface 702*e* of display 700 and coupled to the display 700 using convention methods known in the art. With the display 700 coupled to the support arms 200 using display couplers 210*a*, the display 700 is allowed to rotate relative to the support arms 200 about an axis of rotation A, illustrated in FIG. 8*i*.

Figure 8I:
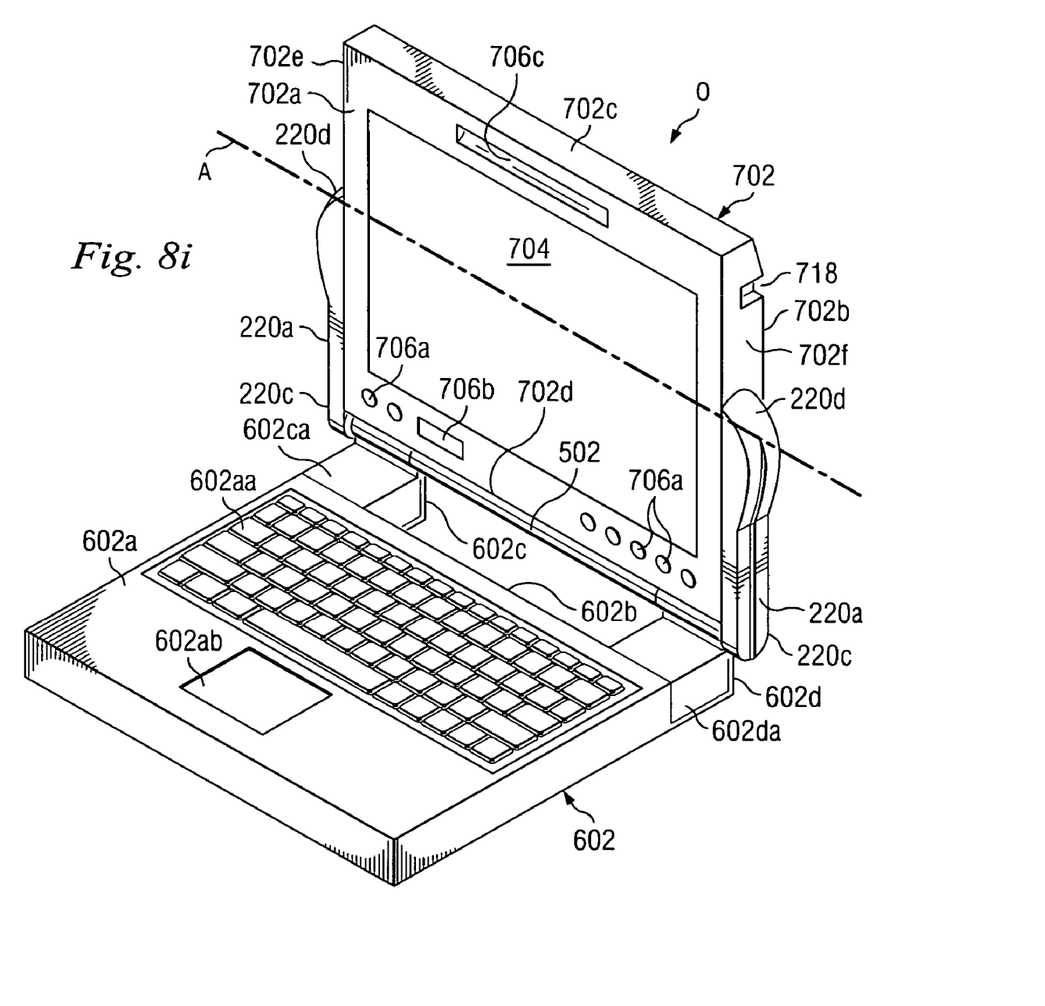
Figure 8J:
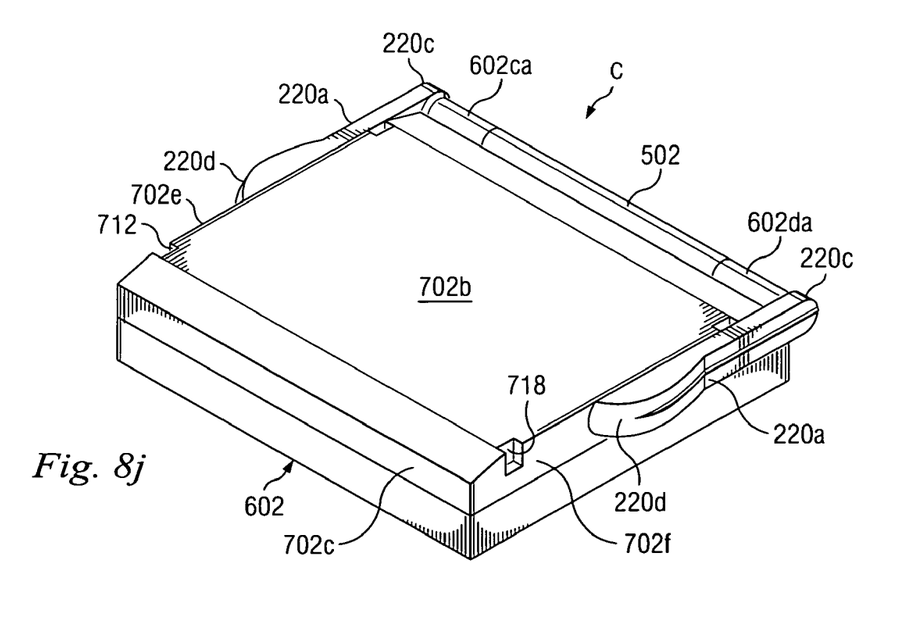

Referring now to FIGS. 8*a*, 8*h*, 8*i*, 8*j*, 8*k*, 8*l*, and 8*m*, the method 800 then proceeds to step 806 where the display 700 is supported with the display supporting apparatus 802*b*. The display 700 may be rotated relative to the support arms 200 and about axis A such that the display securing members 216 on each support arm enter the detent channels 710*a* and 716*a* of support arm coupling members 710 and 716, respectively, causing the detents 710*b* and 716*b*, respectively, to resiliently move out of the detent channels 710*a* and 716*a*, respectively, such that the display securing members 216 move past the detents 710*b* and 716*b*, respectively, and the detents 710*b* and 716*b*, respectively, are resiliently biased back into the detent channels 710*a* and 716*a*, respectively, in order to hold the display securing members 216 in the detent channels 710*a* and 716a, respectively, as illustrated in FIG. 8i. With the display 700 engaging the support arms 200, the support arms 200 may be rotated relative to the chassis base 602 into a closed position C, illustrated in FIG. 8j, with the monitor 704 on the front surface 702a of display 700 facing the input device surface 602a. The detents 710b and 716b are biased into the detent channels 710a and 716a, respectively, with a force which is sufficient such that, during rotation, the display 700 remains between the support arms 200 and does not rotate relative to the support arms 200 due to the detents 710b and 716b holding the display securing members 216 in the detent channels 710a and 716a, respectively. Due to the rigid coupling between the support arms 200 and the interference couplers 300 and between the interference couplers 300 and the torsion bar 500, and due to the structural rigidity of the torsion bar 500 and the support arms 200, the support arms 200 are held in a substantially parallel orientation relative to each other before, during, and after rotation from the open position O to the closed position C. Holding the support arms 200 in a substantially parallel orientation relative to each other provides a rigid display support which keeps the display 700 very steady relative to the chassis 600. Furthermore, due to the rigid coupling between the support arms 200 and the interference couplers 300 and between the interference couplers 300 and the torsion bar 500, and due to the structural rigidity of the torsion bar 500 and the support arms 200, the support arms 200 are held in a substantially perpendicular orientation relative to the stabilizing member 802a before, during, and after rotation from the open position O to the closed position C. Holding the support arms 200 in a substantially perpendicular orientation relative to the stabilizing member 802a provides a rigid display support which keeps the display 700 very steady relative to the chassis 600.

Referring now to FIGS. 8a, 8i, 8k, 8l, and 8m, the support arms 200 may be rotated relative to the chassis base 602 and into the open position O, illustrated in FIG. 8i. During rotation, the display 700 remains between the support arms 200 and does not rotate relative to the support arms 200 due to the detents 710a and 716a holding the display securing members 216 in the detent channels 710b and 716b, respectively. With the support arms 204 and 206 in the open position O, the display 700 is in a notebook mode and may be used, for example, like a convention notebook information handling system. In an embodiment, the base mount 400 may includes a detent which allows the support arms 204 and 206 to be secured into the open position O.

Figure 8K:
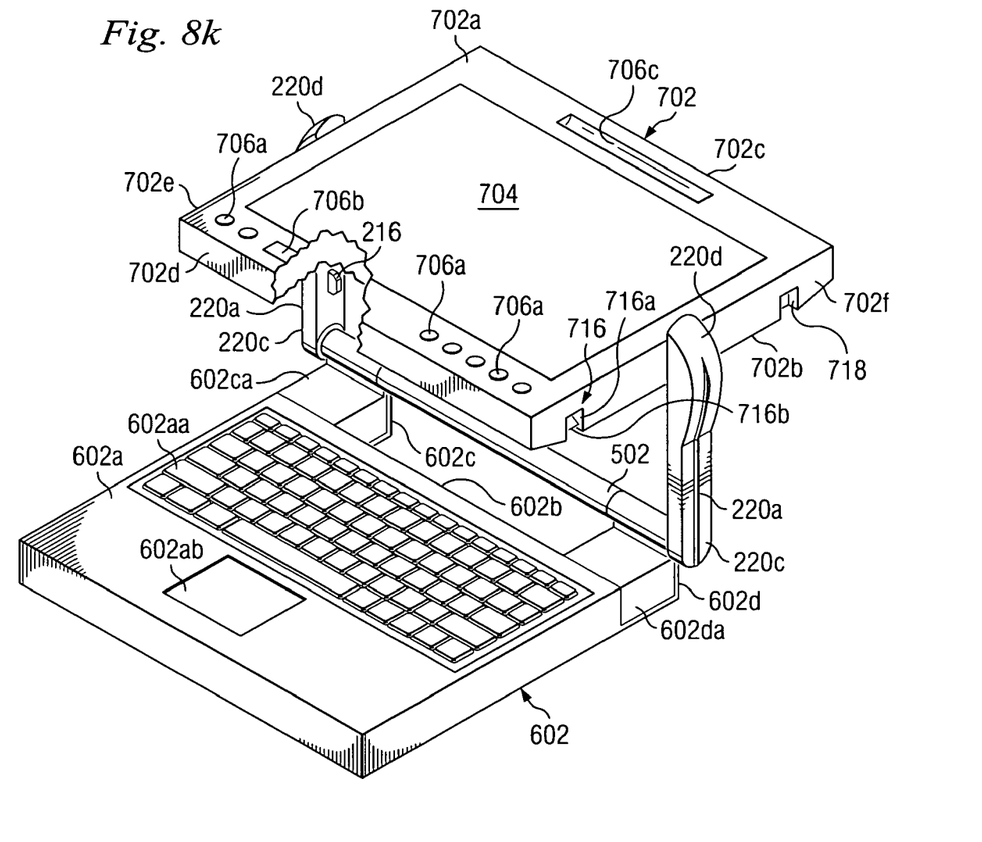

Once the support arms 200 have been rotated into the open position O, the display 700 may be disengaged from the support arms 200 by rotating the display 700 relative to the support arms 700 and about the axis A such that the display securing members 216 engage the detents 710b and 716b and move the detents 710b and 716b resiliently out of the detent channels 710a and 716a, respectively. Further rotation of the display 700 moves the display securing members 216 past the detents 710b and 716b and out of the detent channels 710a and 716a, respectively, allowing the detents 710b and 716b, respectively, to be resiliently biased back into the detent channels 710a and 716a. With the display securing members 216 removed from the detent channels 710a and 716a, the display 700 may be rotated about the axis A and relative to the support arms 200, as illustrated in FIG. 8k. Rotating the display 700 approximately 180 degrees relative to its orientation in notebook mode, illustrated in FIG. 8i, results in the display securing members 216 entering the display coupling member channels 712 and 718, respectively, on display 700, as illustrated in FIG. 8l.

Figure 8M:
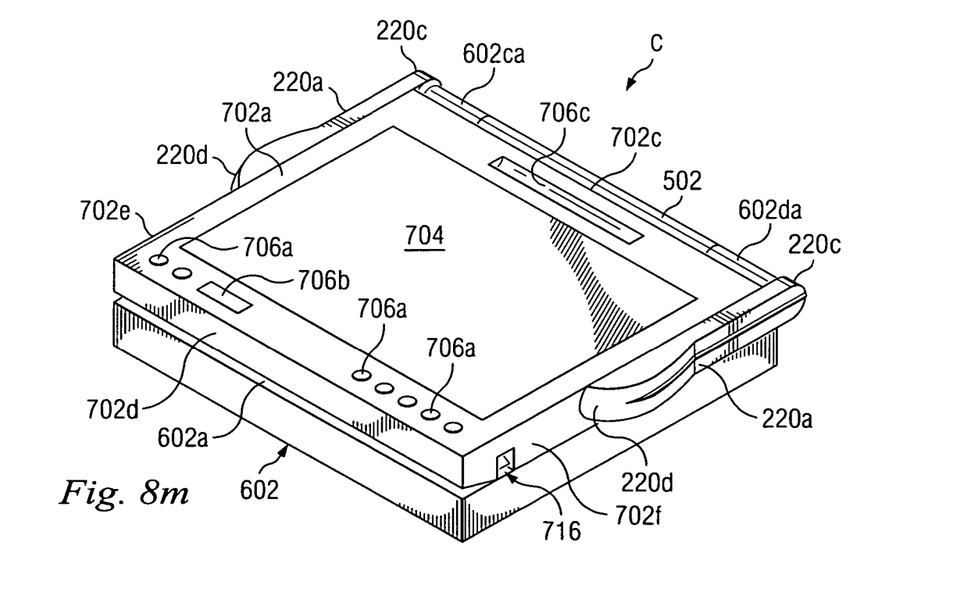

The support arms 200 may then be rotated relative to the chassis base 602 into the closed position C such that the rear surface 702b of the display 700 faces the input device surface 602a, illustrated in FIG. 8m. With the support arms 200 in the closed position C, the display 700 is in a tablet mode and may be used, for example, like a convention tablet information handling system. Due to the rigid coupling between the support arms 200 and the interference couplers 300 and between the interference couplers 300 and the torsion bar 500, and due to the structural rigidity of the torsion bar 500 and the support arms 200, the support arms 200 are held in a substantially parallel orientation relative to each other before, during, and after rotation from the open position O to the closed position C. Holding the support arms 200 in a substantially parallel orientation relative to each other provides a rigid display support which keeps the display 700 very steady relative to the chassis 600. Furthermore, due to the rigid coupling between the support arms 200 and the interference couplers 300 and between the interference couplers 300 and the torsion bar 500, and due to the structural rigidity of the torsion bar 500 and the support arms 200, the support arms 200 are held in a substantially perpendicular orientation relative to the stabilizing member 802a before, during, and after rotation from the open position O to the closed position C. Holding the support arms 200 in a substantially perpendicular orientation relative to the stabilizing member 802a provides a rigid display support which keeps the display 700 very steady relative to the chassis 600. Thus, a method and apparatus are provided which support the display on an information handling system converting from a notebook mode to a tablet mode in order to provide a rigid display mount.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A display support apparatus comprising:
   a stabilizing member defining a cable passageway, wherein the stabilizing member includes a pair of interference couplers each having a pair of opposing cylindrical ends that each include a plurality of circumferentially spaced apart interference fit members that extend from the outer surface of the cylindrical ends, and wherein the stabilizing member further includes a tubular torsion bar that is coupled to each of the interference couplers by an interference fit between the tubular torsion bar and the interference fit members on one of the cylindrical ends of each interference coupler;
   a rotational coupling member coupled to the stabilizing member; and
   a pair of support arms coupled to the stabilizing member, at least one support arm defining a cable-routing channel, whereby the stabilizing member rigidly maintains the pair of support arms in a substantially parallel orientation relative to each other.

2. The apparatus of claim 1 wherein each support arm is rigidly coupled to one of the interference couplers on the stabilizing member by an interference fit between the support arm and the plurality of interference fit members on the cylindrical end of the interference coupler that is not coupled to the tubular torsion bar.

3. The apparatus of claim 1 wherein the plurality of interference fit members extend from the outer surface of the cylindrical ends of the interference couplers such that the distance between a surface on each of the plurality of interference fit members and the outer surface of the cylindrical ends increases along the length of the interference fit member.

4. The apparatus of claim 1 wherein the interference coupler is fabricated from a high-strength metal.

5. The apparatus of claim 1 wherein the plurality of interference fit members are located about the circumference of the outer surface of the cylindrical ends in an equally spaced apart orientation from each other.

6. The apparatus of claim 1 wherein the stabilizing member rigidly maintains the support arms in a substantially perpendicular orientation relative to the stabilizing member.

7. The apparatus of claim 1 further comprising:
a display coupling member rotatably coupled to each of the plurality of support arms.

8. The apparatus of claim 1 wherein the rotational coupling member comprises a plurality of base mounts rotationally coupled to the stabilizing member, whereby a cable-passageway entrance is located between the base mounts.

9. An information handling system comprising:
a base;
a microprocessor mounted in the base;
a rotational coupling member mounted to the base;
a stabilizing member rotatably coupled to the rotational coupling member and defining a cable passageway, wherein the stabilizing member includes a pair of interference couplers each having a pair of opposing cylindrical ends that each include a plurality of circumferentially spaced apart interference fit members that extend from the outer surface of the cylindrical ends, and wherein the stabilizing member further includes a tubular torsion bar that is coupled to each of the interference couplers by an interference fit between the tubular torsion bar and the interference fit members on one of the cylindrical ends of each interference coupler;
a pair of support arms coupled to the stabilizing member, at least one support arm defining a cable-routing channel, whereby the stabilizing member rigidly maintains the pair of support arms in a substantially parallel orientation relative to each other; and
a display rotatably coupled to the plurality of support arms.

10. The system of claim 9 wherein each support arm is rigidly coupled to one of the interference couplers on the stabilizing member by an interference fit between the support arm and the plurality of interference fit members on the cylindrical end of the interference coupler that is not coupled to the tubular torsion bar.

11. The system of claim 9 wherein the plurality of interference fit members extend from the outer surface of the cylindrical ends of the interference couplers such that the distance between a surface on each of the plurality of interference fit members and the outer surface of the cylindrical ends increases along the length of the interference fit member.

12. The system of claim 9 wherein the interference coupler is fabricated from a high-strength metal.

13. The system of claim 9 wherein the plurality of interference fit members are located about the circumference of the outer surface of the cylindrical ends in an equally spaced apart orientation from each other.

14. The system of claim 9 wherein the stabilizing member rigidly maintains the support arms in a substantially perpendicular orientation relative to the stabilizing member.

15. The system of claim 9 wherein the rotational coupling member comprises a plurality of base mounts rotatably coupled to the stabilizing member, whereby a cable-passageway entrance is located between the base mounts.

16. The system of claim 9 wherein a display cable is positioned in the cable passageway and cable-routing channel.

17. The system of claim 9 wherein the rotational coupling member includes a detent which allows the plurality of support arms to be secured in an open position.

18. A method for supporting a display on a chassis comprising:
providing an information handling system chassis including a stabilizing member rotatably coupled to the chassis base, and a pair of substantially parallel and spaced-apart support arms rigidly coupled to the stabilizing member, wherein the stabilizing member includes a pair of interference couplers each having a pair of opposing cylindrical ends that each include a plurality of circumferentially spaced apart interference fit members that extend from the outer surface of the cylindrical ends, and wherein the stabilizing member further includes a tubular torsion bar that is coupled to each of the interference couplers by an interference fit between the tubular torsion bar and the interference fit members on one of the cylindrical ends of each interference coupler, and wherein each support arm is rigidly coupled to one of the interference couplers on the stabilizing member by an interference fit between the support arm and the plurality of interference fit members on the cylindrical end of the interference coupler that is not coupled to the tubular torsion bar;
rotatably coupling a display to the plurality of support arms; and
supporting the display with the stabilizing member and support arms, whereby the supporting comprises the stabilizing member rigidly maintaining the plurality of support arms in a substantially parallel orientation relative to each other.

19. The method of claim 18 further comprising:
routing a display cable through a cable passageway defined by the stabilizing member and a cable-routing channel defined by at least one support arm.

20. The method of claim 19 wherein the supporting comprises the stabilizing member rigidly maintaining the support arms in a substantially perpendicular orientation relative to the stabilizing member.

* * * * *